United States Patent
Benisty et al.

(10) Patent No.: US 11,734,018 B2
(45) Date of Patent: Aug. 22, 2023

(54) PARALLEL BOOT EXECUTION OF MEMORY DEVICES

(71) Applicant: Western Digital Technologies, Inc., San Jose, CA (US)

(72) Inventors: Shay Benisty, Beer Sheva (IL); Judah Gamliel Hahn, Ofra (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 292 days.

(21) Appl. No.: 16/932,477

(22) Filed: Jul. 17, 2020

(65) Prior Publication Data

US 2022/0019443 A1   Jan. 20, 2022

(51) Int. Cl.
G06F 9/44 (2018.01)
G06F 9/4401 (2018.01)
G06F 3/06 (2006.01)
G06F 21/57 (2013.01)
G06F 9/445 (2018.01)

(52) U.S. Cl.
CPC .......... G06F 9/4403 (2013.01); G06F 3/0611 (2013.01); G06F 3/0659 (2013.01); G06F 3/0673 (2013.01); G06F 21/575 (2013.01); G06F 9/445 (2013.01); G06F 2221/033 (2013.01)

(58) Field of Classification Search
CPC ..................................... G06F 1/32; G06F 9/44
See application file for complete search history.

(56) References Cited

U.S. PATENT DOCUMENTS

| | | | |
|---|---|---|---|
| 8,254,568 B2* | 8/2012 | Smith | G06F 21/575 713/1 |
| 9,563,382 B2 | 2/2017 | Hahn et al. | |
| 9,575,768 B1* | 2/2017 | Kim | G06F 9/4401 |
| 9,983,889 B1* | 5/2018 | Sarmah | G06F 9/445 |
| 10,055,236 B2 | 8/2018 | Erez et al. | |
| 10,360,156 B2 | 7/2019 | Yun et al. | |
| 10,558,367 B2 | 2/2020 | Benisty | |
| 10,613,778 B2 | 4/2020 | Hahn et al. | |
| 10,712,949 B2 | 7/2020 | Hahn et al. | |
| 11,010,095 B2 | 5/2021 | Richter et al. | |
| 11,036,425 B2 | 6/2021 | Lee et al. | |
| 2007/0033311 A1* | 2/2007 | Young | G06F 13/1668 710/107 |
| 2008/0229090 A1* | 9/2008 | Choi | G06F 9/4401 711/E12.008 |

(Continued)

*Primary Examiner* — Keshab R Pandey
(74) *Attorney, Agent, or Firm* — Patterson + Sheridan, LLP; Steven H. VerSteeg (57) ABSTRACT

The present disclosure generally relates to reducing boot latency of memory devices in a dual boot system. The boot code is loaded to the data storage device controller in a flexible manner by being able to receive chunks of the boot code from two separate locations, the host memory buffer (HMB) and the memory device, which may be a NAND device. Part of the boot code may be received from the HMB and another part of the boot code may be received from the memory device. If either the HMB or the memory device can deliver the chunks faster than the other, then the controller can receive the chunks from the faster location and periodically confirm the speed of delivery to ensure the boot code latency is optimized.

20 Claims, 5 Drawing Sheets

(56) References Cited

U.S. PATENT DOCUMENTS

| | | | |
|---|---|---|---|
| 2014/0244989 A1* | 8/2014 | Hiltgen | G06F 9/4416 |
| | | | 713/2 |
| 2017/0242606 A1 | 8/2017 | Vlaiko et al. | |
| 2018/0173536 A1 | 6/2018 | Sela et al. | |
| 2019/0042460 A1 | 2/2019 | Trika et al. | |
| 2019/0042757 A1* | 2/2019 | Ho | G06F 21/575 |
| 2020/0151055 A1* | 5/2020 | Eom | G06F 3/0619 |
| 2021/0191884 A1 | 6/2021 | Hwang et al. | |
| 2022/0019443 A1 | 1/2022 | Benisty et al. | |

\* cited by examiner

PARALLEL BOOT EXECUTION OF MEMORY DEVICES

BACKGROUND OF THE DISCLOSURE

Field of the Disclosure

Embodiments of the present disclosure generally relate to reducing boot latency of memory devices in a dual boot system.

Description of the Related Art

The initiation process of a computing system is usually referred to as boot or booting. During the boot procedure, a designated code is loaded into the processing unit placed at the memory device controller in order to initiate the awakening procedure of the data storage device. The duration of the boot is an important factor for consumers, and the time for the controller to load the boot code from an external location where the boot code is stored may be of high consideration to allow standing in the overall boot duration requirements.

For NAND based memory devices, the default storage place for the boot code is in the NAND memory itself. However, the NVMe standard provides a further option at which the host device DRAM partition (i.e., the portion of the host DRAM that is allocated for the data storage device) may be used for storing the boot code. When using the host DRAM for boot code storage, the DRAM partition is referred to as the host memory buffer (HMB).

Currently, the boot procedure proceeds by initiating booting from a single location, either the NAND or the HMB. Both NAND and HMB have pros and cons. For NAND, the NAND is usually available prior to the HMB and parallel sense can occur on multiple dies, however, the sense time may be a detriment. For HMB, there is high throughput and the HMB might, in some cases, be available before the NAND, but HMB is not always available in boot, depends upon the host device, and must have a link to the host device.

Therefore, there is a need in the art for a boot procedure that accelerates the boot process by leveraging the advantages of both NAND and HMB.

SUMMARY OF THE DISCLOSURE

The present disclosure generally relates to reducing boot latency of memory devices in a dual boot system. The boot code is loaded to the data storage device controller in a flexible manner by being able to receive chunks of the boot code from two separate locations, the host memory buffer (HMB) and the memory device, which may be a NAND device. Part of the boot code may be received from the HMB and another part of the boot code may be received from the memory device. If either the HMB or the memory device can deliver the chunks faster than the other, then the controller can receive the chunks from the faster location and periodically confirm the speed of delivery to ensure the boot code latency is optimized.

In one embodiment, a data storage device comprises: one or more memory devices; and a controller coupled to the one or more memory devices, wherein the controller is configured to: receive boot code chunks of a boot code from a host device; and receive boot code chunks of the boot code from the one or more memory devices.

In another embodiment, a data storage device comprises: one or more memory devices; and a controller coupled to the one or more memory devices, wherein the controller is configured to: receive boot code chunks of a boot code from both a host device and the one or more memory devices; confirm that all boot code chunks have been received; confirm authentication signatures for the boot code; determine whether a boot code chunk was invalid; determine whether the invalid boot code chunk was from the host device or the one or more memory devices; and receive a valid boot code chunk from whichever of the host device and the one or more memory device did not deliver the invalid boot code chunk.

In another embodiment, a data storage device comprises: one or more memory devices; and a controller coupled to the one or more memory devices, wherein the controller is configured to: receive boot code chunks of a boot code from either the one or more memory devices or a host device; after a predetermined number of data storage device boots, receive boot data chunks from the other of the one or more memory devices or the host device; and determine whether an average latency for receiving the boot code from the one or more memory devices is different from the average latency for receiving the boot code from the host device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to reducing boot latency of memory devices in a dual boot system. The boot code is loaded to the data storage device controller in a flexible manner by being able to receive chunks of the boot code from two separate locations, the host memory buffer (HMB) and the memory device, which may be a NAND device. Part of the boot code may be received from the HMB and another part of the boot code may be received from the memory device. If either the HMB or the memory device can deliver the chunks faster than the other, then the controller can receive the chunks from the faster location and periodically confirm the speed of delivery to ensure the boot code latency is optimized.

Figure 1:
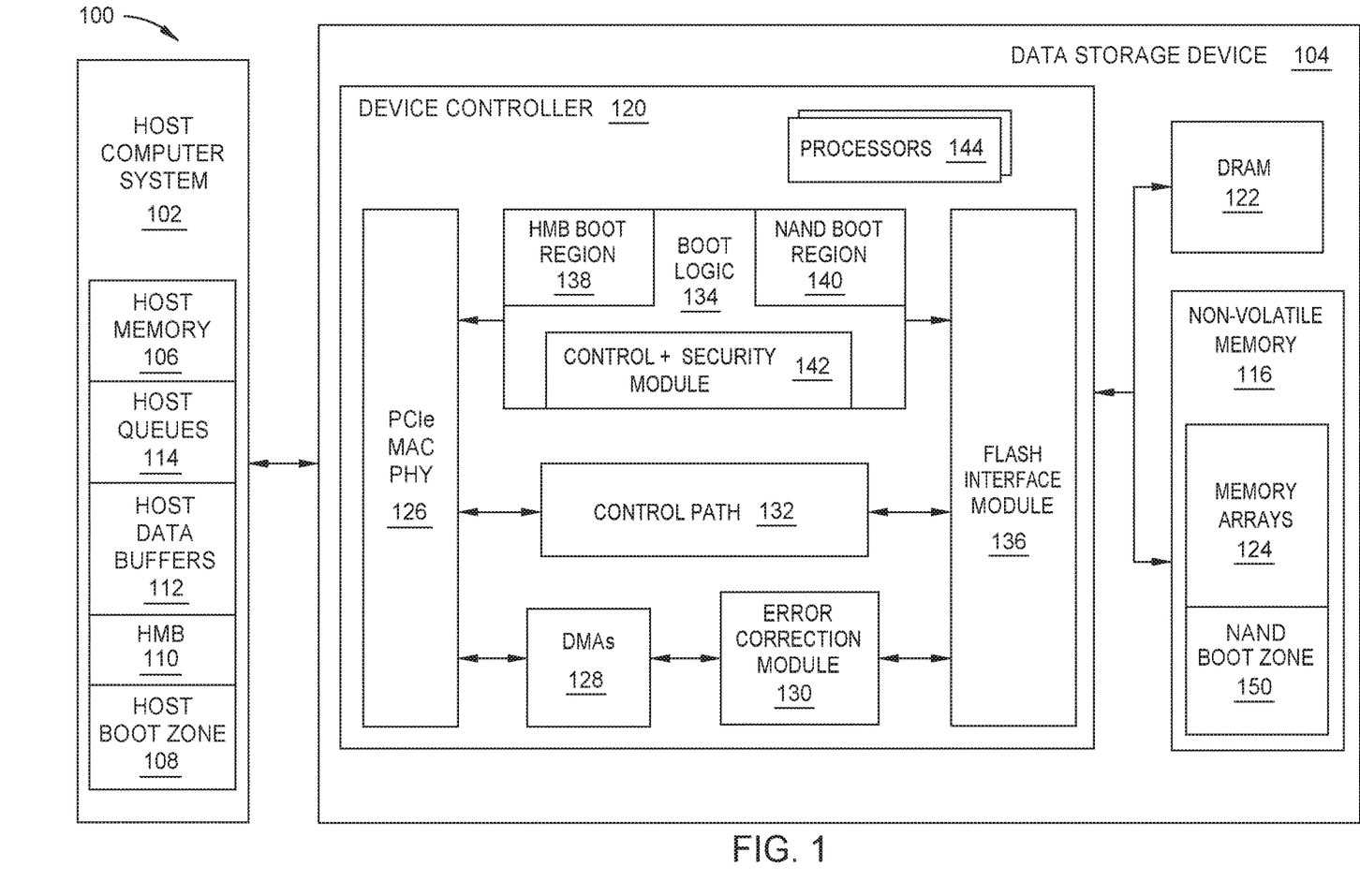
FIG. 1 is a schematic illustration of a data storage system, according to one embodiment.

FIG. 1 is a schematic illustration of a data storage system 100, according to one embodiment. The data storage system 100 includes a host computer system 102 and a data storage device 104. The data storage device 104 may function as a storage device for the host computer system 102. For instance, the host computer system 102 may utilize a non-volatile memory (NVM) 116, such as NAND, included in the data storage device 104 to store and retrieve data. In some examples, the data storage system 100 may include a plurality of storage devices, such as the data storage device 104, which may operate as a storage array. For example, the data storage system 100 may include a plurality of data storage devices 104 configured as a redundant array of inexpensive/independent disks (RAID) that collectively function as a mass data storage device for the host computer system 102.

The host computer system 102 includes a host memory 106 that includes a host boot zone 108 that is a part of a host memory buffer (HMB) 110, a host data buffer 112, and a host queue 114. HMB 110 is a storage in the host computer system 102 host memory 106 that is allocated to the data storage device 104. The data storage device 104 is capable of utilizing the HMB 110 in whatever function is needed. In the embodiments discussed herein, the data storage device 104 utilizes the HMB 110 for storing the boot code. The host computer system 102 may store and/or retrieve data to and/or from one or more storage devices, such as the data storage device 104. The host computer system 102 may communicate with the data storage device 104 via an interface. The host computer system 102 may include any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

In some embodiments, the host queue 114 includes one or more host queues, where the host queue 114 stores generated commands for the data storage device 104 to fetch. Furthermore, the data of the generated commands in the one or more host queues 114 may be stored in the host data buffer 112. In some embodiments, the host data buffer 112 includes one or more host data buffers.

The HMB 110 of the host memory 106 may be a host DRAM partition that is allocated for the data storage device 104. A boot code (i.e., the code used for the initiation process of a computing system or a boot operation) may be stored in the HMB 110. More specifically, the boot code is stored in the host boot zone 108 of the HMB 110. During boot operations, the boot code is fetched from the HMB 110 and transferred to the device controller 120. Because HMB 110 is volatile memory, the boot code is written during the previous run-time. During boot time, and only if HMB 110 is available while the HMB 110 content is still valid, the boot code could be fetched from HMB 110.

The data storage device 104 includes a device controller 120, a volatile memory, such as a dynamic random-access memory (DRAM) 122, and an NVM 116. In some examples, the data storage device 104 may include additional components not shown in FIG. 1 for the sake of clarity. For example, the data storage device 104 may include a printed circuit board (PCB) to which components of the data storage device 104 are mechanically attached and which includes electrically conductive traces that electrically interconnect components of the data storage device 104, or the like. In some examples, the physical dimensions and connector configurations of the data storage device 104 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 104 may be directly coupled (e.g., directly soldered) to a motherboard of the host computer system 102.

In some examples, the data storage device 104 may include an interface, which may include one or both of a data bus for exchanging data with the host computer system 102 and a control bus for exchanging commands with the host computer system 102. The interface may operate in accordance with any suitable protocol. For example, the interface may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface (e.g., the data bus, the control bus, or both) is electrically connected to the device controller 120, providing electrical connection between the host computer system 102 and the device controller 120, allowing data to be exchanged between the host computer system 102 and the device controller 120. In some examples, the electrical connection of the interface may also permit the data storage device 104 to receive power from the host computer system 102. For example, a power supply may receive power from the host computer system 102 via the interface.

The data storage device 104 includes NVM 116 which may include a plurality of memory devices or memory units and an NAND boot zone 150. The plurality of memory device or memory units may be arranged into one or more memory arrays 124. The boot code, which may be the same as the boot code stored in the HMB 110 of the host computer system 102, may be stored in the one or more memory arrays 124. During boot operations, the boot code is fetched from the NAND boot zone 150 and transferred to the device controller 120.

The NVM 116 may be configured to store and/or retrieve data. For instance, a memory unit of NVM 116 may receive data and a message from the device controller 120 that instructs the memory unit to store the data. Similarly, the memory unit of NVM 116 may receive a message from the device controller 120 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 116 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 116 may include a plurality of flash memory devices or memory units. Flash memory devices may include NAND or NOR based flash memory devices and may store data based on a charge contained in a floating gate of a transistor for each flash memory cell. In NAND flash memory devices, the flash memory device may be divided into a plurality of blocks, which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices and may be single level cell (SLC), multi-level cell (MLC), triple level cell (TLC), or quad level cell (QLC). The device controller 120 may write data to and read data from NAND flash memory devices at the page level and erase data from NAND flash memory devices at the block level.

In some examples, the data storage device 104 includes a power supply, which may provide power to one or more components of the data storage device 104. When operating in a standard mode, the power supply may provide power to one or more components using power provided by an external device, such as the host computer system 102. For instance, the power supply may provide power to the one or more components using power received from the host computer system via the interface of the data storage device 104. In some examples, the power supply may include one or more power storage components configured to provide power to the one or more components when operating in a shutdown mode, such as where power ceases to be received from the external device. In this way, the power supply may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

In some examples, the data storage device 104 may include one or more volatile memories, such as the DRAM 122, which may be used by the device controller 120 to store information. Furthermore, the device controller 120 may include one or more volatile memories. In some examples, the device controller 120 may use volatile memory as a cache. For instance, the device controller 120 may store cached information in volatile memory until cached information is written to the NVM 116. Examples of volatile memory include, but are not limited to, random-access memory (RAM), DRAM, static RAM (SRAM), and synchronous dynamic RAM (SDRAM (e.g., DDR1, DDR2, DDR3, DDR3L, LPDDR3, DDR4, LPDDR4, and the like)).

The data storage device 104 includes a device controller 120, which may manage one or more operations of the data storage device 104. For instance, the device controller 120 may manage the reading of data from and/or the writing of data to the NVM 116. In some embodiments, when the data storage device 104 receives a write command from the host computer system 102, the device controller 120 may initiate a data storage command to write data to the NVM 116 and monitor the progress of the data storage command. The device controller 120 may determine at least one operational characteristic of the data storage system 100 and store the at least one operational characteristic to the NVM 116. In some embodiments, when the data storage device 104 receives a write command from the host computer system 102, the controller 120 temporarily stores the data associated with the write command in the internal memory or a write buffer before sending the data to the NVM 116.

The device controller includes a PCIe MAC PHY 126, a boot logic 134, a control path 132, one or more direct memory accesses (DMAs) 128, an error correction module 130, a flash interface module (FIM) 136, and one or more processors 144. The one or more processors 144 is a chip or a logical circuit that responds and processes commands to operate a computing system, such as the data storage device 104. The one or more processors 144 may perform all mathematical operations and manage the controller operations.

Ingress and egress of data to the data storage device 104 from the host computer system 102 may be performed through a PCIe MAC PHY 126. If commands have been completed by the device controller 120, the data associated with the completed commands may be transferred through the PCIe MAC PHY 126 to the host queues 114 present in the host computer system 102.

Data passes from the PCIe MAC PHY 126 to the control path 132 and the one or more DMAs 128. The one or more DMAs 128 may execute data transfers between host computer system 102 and data storage device 104 without involvement from a host computer system 102 CPU. The control path 132 may be utilized for fetching physical page regions (PRPs), posting completion and interrupts, and activating the DMAs 128 for data transfer between host computer system 102 and data storage device 104. Error correction module 130 corrects the data fetched from the memory arrays. The device controller 120 may utilize the FIM 136 to interact with the NVM 116 for read and write operations.

The boot logic 134 includes a HMB boot region 138, a NAND boot region 140, and a control and security module 142. The boot logic 135 recognizes the parallel boot execution by the HMB boot zone 108 and the NAND boot zone 150. The HMB boot region 138 may determine the status of the boot from the HMB boot zone 108. Similarly, the NAND boot region 140 may determine the status of the boot from the NAND boot zone 150. The control and security module 142 may be utilized for the control and the implementation of the parallel boot execution by the HMB boot zone 108 and the NAND boot zone 150.

Figure 2:
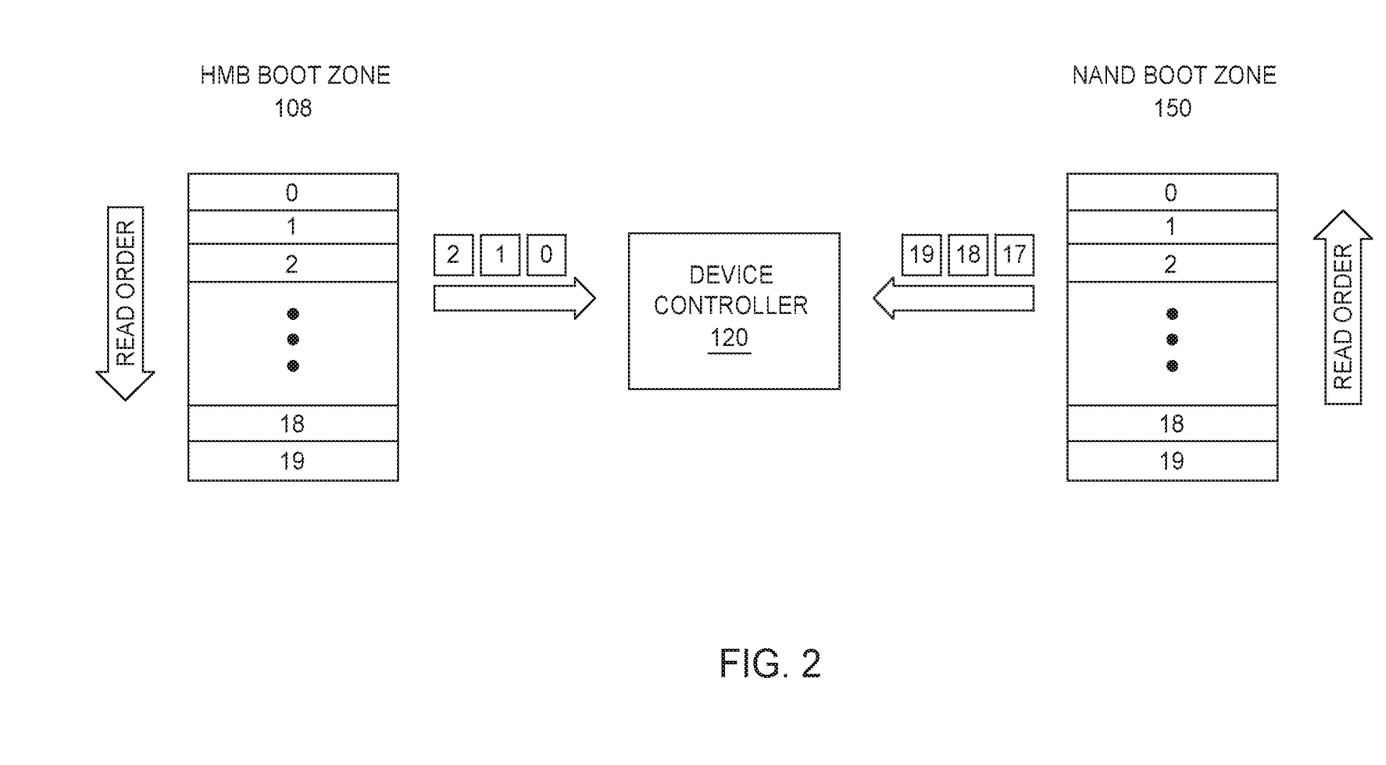
FIG. 2 is a schematic illustration of a dual boot process, according to one embodiment.

FIG. 2 is a schematic illustration of a parallel boot process, according to one embodiment. The boot code is stored in the HMB 110 and the memory arrays 124 of FIG.

1. The boot code is the same in both the host boot zone 108 and the NAND boot zone 150. The boot code, including the relevant context, of about 80 KB is divided into chunks of a predetermined size, such as about 4 KB. For example, the HMB boot zone 108 includes about 20 chunks of about 4 KB and the NAND boot zone 150 includes about 20 chunks of about 4 KB.

Illustrated in FIG. 2, the first 4 KB chunk of the boot code is denoted by a 0, the second 4 KB chunk of the boot code is denoted by a 1, and so forth. When the boot operation is initiated, the boot code chunks are fetched from the HMB boot zone 108 of the HMB 110 and the same boot code chunks are fetched from the NAND boot zone 150. The boot code chunks of both the HMB boot zone 108 and the NAND boot zone 150 are fetched concurrently at the device controller 120 during the boot operation and stored internally in controller memory, such as SRAM, of the device controller 120. In one embodiment, the fetch from the HMB boot zone 108 may occur quicker than the fetch from the NAND boot zone 150. In another embodiment, the fetch from the NAND boot zone 150 may occur quicker than the fetch from the HMB boot zone 108.

When reading the boot code from the HMB boot zone 108, the first boot code chunk 0 is read first, the second boot code chunk 1 is read second, and so forth. The read from the HMB boot zone 108 may be read from the first boot code chunk (e.g., chunk 0) to the last boot code chunk (e.g., chunk 19). When reading from the NAND boot zone 150, the last boot code chunk 19 is read first, the second-to-last boot code chunk 18 is read second, and so forth. The read from the NAND boot zone 150 may be read from the last boot code chunk (e.g., chunk 19) to the first boot code chunk (e.g., chunk 0). In another embodiment, the listed read order of the boot code chunks from the HMB boot zone 108 and the NAND boot zone 150 may be switched. When the entire boot code is read, collectively from the HMB boot zone 108 and the NAND boot zone 150, the boot operation is completed.

The entire boot code may be read partially from the HMB boot zone 108 and partially from the NAND boot zone 150, where each part of the boot code read from the HMB boot zone 108 and the NAND boot zone 150 is equal. For example, the boot code chunks 0-9 may be read from the HMB boot zone 108 and the remaining boot code chunks 10-19 may be read from the NAND boot zone 150. Because the total boot code has been read, the boot process has been completed.

In another embodiment, the entire boot code may be read partially from the HMB boot zone 108 and partially from the NAND boot zone 150, where each part of the boot code read from the HMB boot zone 108 and the NAND boot zone 150 are not equal. For example, the boot code chunks 0-13 may be read from the HMB boot zone 108 and the remaining boot code chunks 14-19 may be read from the NAND boot zone 150. Because the total boot code has been read, the boot process has been completed.

Because uneven amounts of boot code chunks may be read from the HMB boot zone and the NAND boot zone, the controller may place the relevant portion of the boot code in the HMB and the NAND. For example, if the parallel loading (i.e., the read to the controller) finishes at boot code chunk 12, then boot code chunks 0-12 are read from a first location, such as the HMB boot zone 108, and the boot code chunks 12-19 are read from a second location, such as the NAND boot zone 150. Therefore, the HMB boot zone 108 may load faster (i.e., the read to the controller is faster). Because of the faster read speed of the HMB boot zone 108, boot code chunks 0-14 (i.e., 15 boot code chunks) may be placed in the HMB and boot code chunks 11-19 (i.e., 9 boot code chunks) may be placed in the NAND. The overlap or overhead of the boot code chunks 11-14 may account for read throughput variations. The listed example is not intended to be limiting, but to provide an example of a possible embodiment.

Figure 3A:
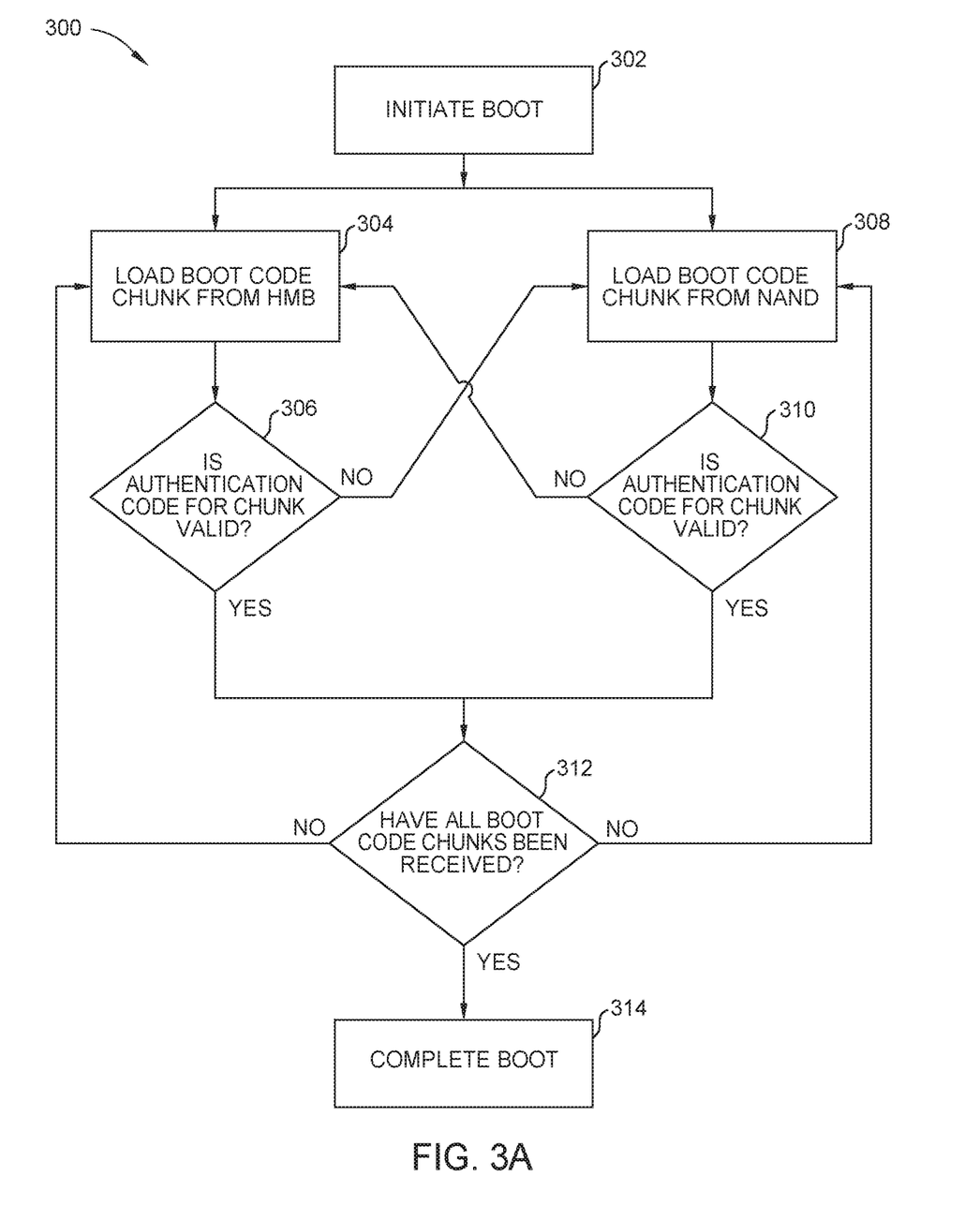
FIG. 3A is a flowchart illustrating a boot process, according to one embodiment.

FIG. 3A is a flowchart illustrating a boot process 300, according to one embodiment. The boot process 300 describes the boot operation of the data storage device when each of the boot code chunks includes an authentication code or an authentication signature. The terms "authentication code" and "authentication signature" may be used interchangeably herein and may have the same meaning. The authentication code checks for a valid boot code chunk. At block 302, the boot operation is initiated. At block 304, the boot code chunks are loaded from the HMB to the internal memory of the device controller. At block 308, the boot code chunks are loaded from the NAND boot zone to the internal memory of the device controller. The load of the boot code chunks from both the HMB and the NAND at blocks 304 and 308 may occur concurrently.

Each time that a boot code chunk is read from the HMB boot zone or the NAND boot zone and delivered to the controller, the controller checks for the valid authentication code at blocks 306 and 310. When boot code chunk includes an invalid authentication code, the controller may be configured to receive the corresponding boot code chunk from the other boot zone. The controller includes logic, such as the boot logic 134 of FIG. 1, to determine the originating location (e.g., the HMB boot zone or the NAND boot zone) of the relevant boot code chunk with the invalid authentication code. For example, if the boot code chunk 0 of the HMB boot zone includes an invalid authentication code, the controller may be configured to receive the boot code chunk 0 from the NAND boot zone to replace the invalid boot code chunk 0 received from the HMB boot zone. Likewise, if the boot code chunk 0 of the NAND boot zone includes an invalid authentication code, the controller may be configured to receive the boot code chunk 0 from the HMB boot zone to replace the invalid boot code chunk 0 received from the NAND boot zone.

At block 312, the controller determines if all the boot code chunks that includes a valid authentication code have been received. In some examples, the controller may receive the same one or more boot code chunks from both the NAND boot zone and the HMB boot zone. When all the boot code chunks that includes a valid authentication code have been received at block 312, the boot process is completed at block 314. However, if not all of the boot code chunks have been received, the remaining boot code chunks are loaded at blocks 304 to the HMB boot zone and at block 308 to the NAND boot zone.

Figure 3B:
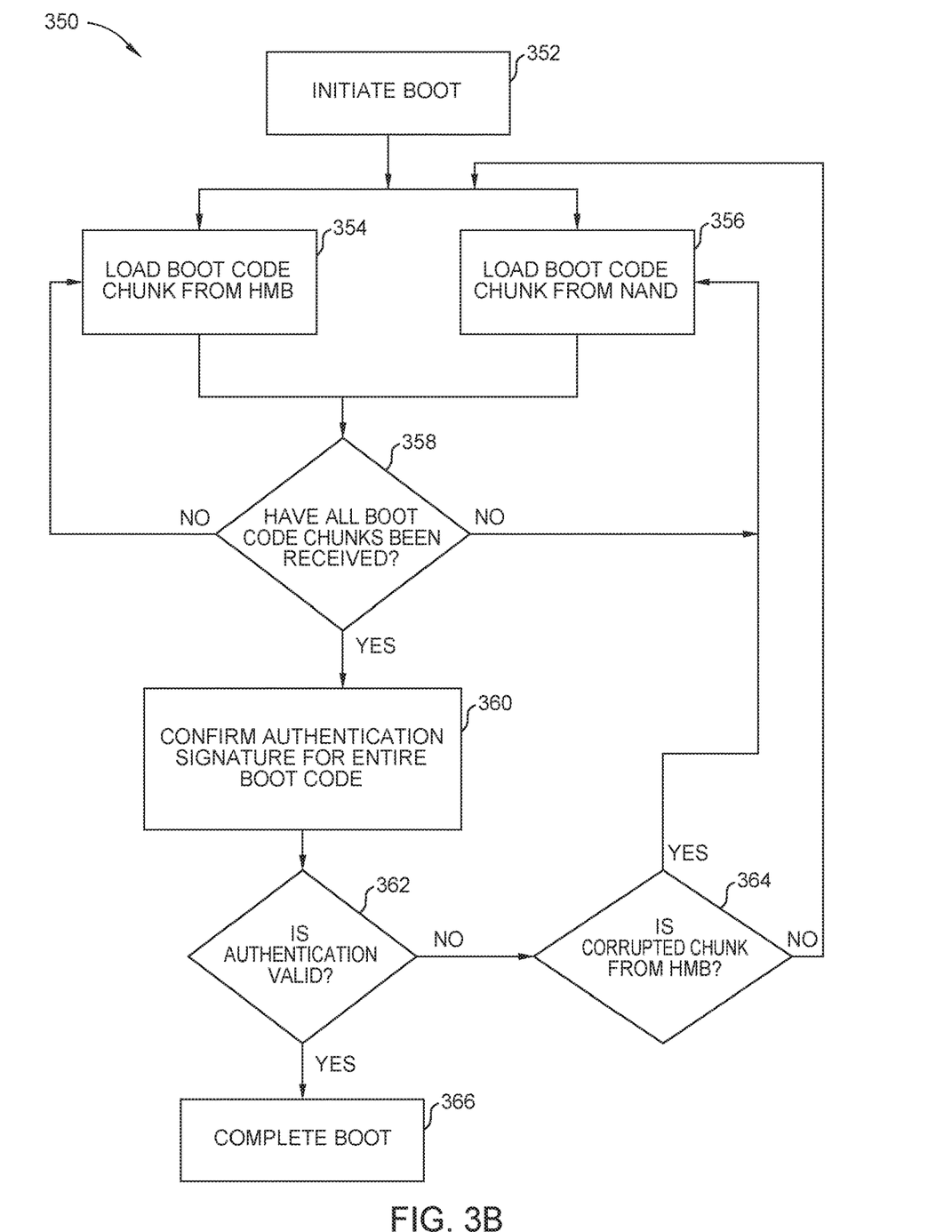
FIG. 3B is a flowchart illustrating a boot process, according to another embodiment.

FIG. 3B is a flowchart illustrating a boot process 350, according to another embodiment. The boot process 350 describes the boot operation of the data storage device when the controller checks for a valid authentication code or authentication signature for the entire boot code. The terms "authentication code" and "authentication signature" may be used interchangeably herein and may have the same meaning. The authentication code checks for a valid boot code chunk. At block 352, the boot operation is initiated. At block 354, the boot code chunks are fetched from the HMB boot zone and stored in the internal memory of the device controller. At block 356, the boot code chunks are fetched from the NAND boot zone and stored in the internal memory of the device controller. The load of the boot code chunks from both the HMB and the NAND at blocks 354 and 356 may occur concurrently.

The controller determines if all the boot code chunks have been received at the controller at block 358. If less than all of the boot code chunks have been received at the controller at block 358, the controller waits until the all of the boot code chunks have been received. The boot code chunks may be received from the HMB boot zone, the NAND boot zone, or from both the HMB boot zone and the NAND boot zone. After all the boot code chunks have been read from the HMB boot zone and the NAND boot zone and delivered to the controller at block 358, the controller confirms the authentication signature for the entire boot code at block 360.

If the authentication signature is valid at block 362, then the boot operation is completed. However, if the authentication signature is invalid, then the controller utilizes logic, such as the boot logic 134 of FIG. 1, to determine if the corrupted boot code chunk that resulted in the invalid authentication signature is from the HMB at block 364. If the corrupted boot code chunk is from the HMB, then the relevant boot code chunk is loaded from the NAND boot zone stored in the internal memory of the controller at block 356. However, if the corrupted boot code chunk is not from the HMB (i.e., from the NAND), then the relevant boot code chunk is loaded from the HMB and stored in the internal memory of the controller at block 354. The re-load of the boot code chunk from the other boot zone may occur for each instance of a corrupted boot code chunk. When the authentication signature is valid at block 362, the boot operation is completed at block 366.

Figure 4:
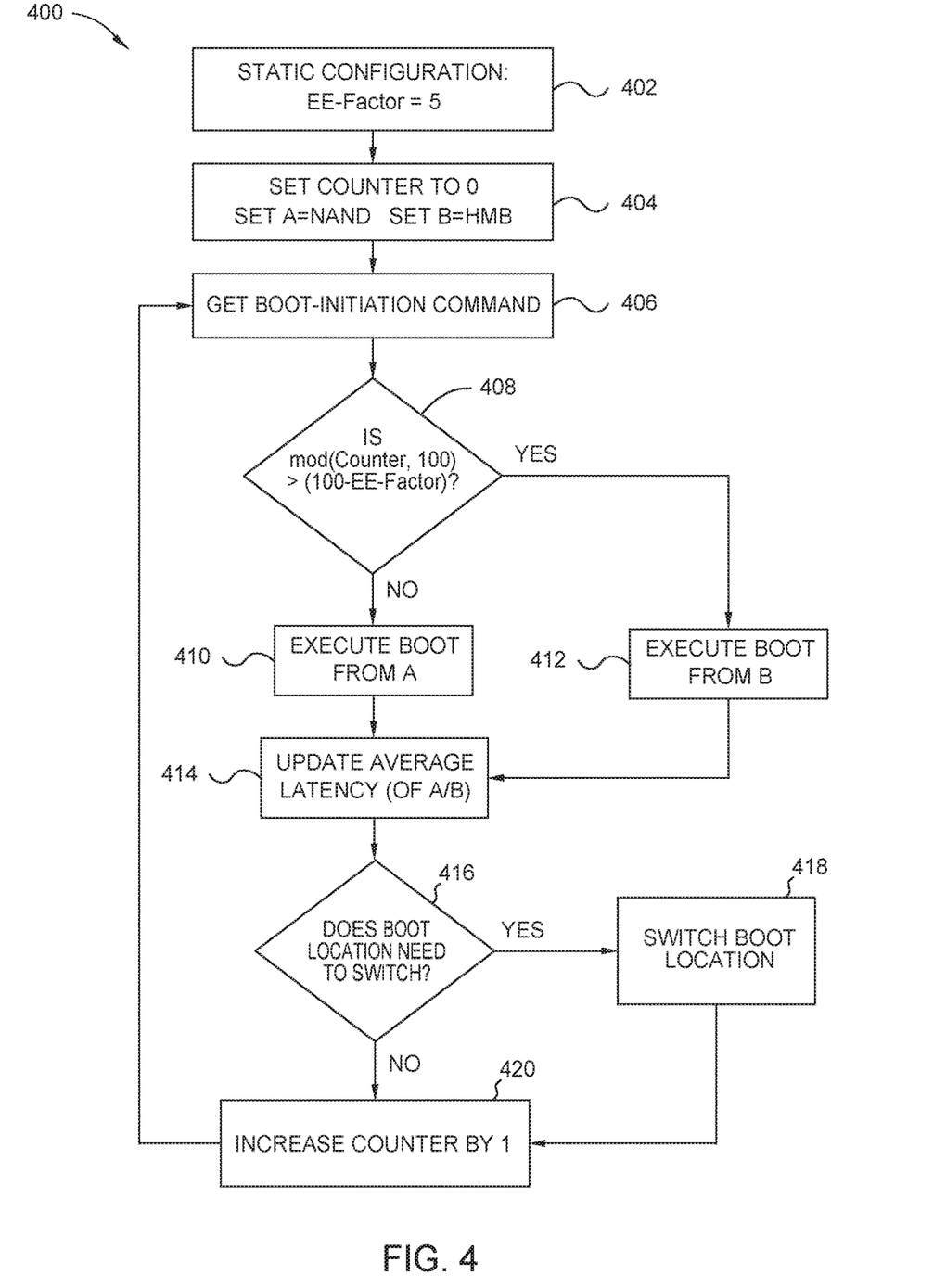
FIG. 4 is a flowchart illustrating a boot process, according to another embodiment.

FIG. 4 is a flowchart illustrating a boot process 400, according to another embodiment. The boot process 400 describes the boot operation of the data storage device during an "explore-exploit" trade off, such as when the host device (e.g., the host computer system 102 of FIG. 1) has an average latency that is different from the average latency of the one or more memory devices, (e.g., the NVM 116 of FIG. 1). The boot code is stored in both the HMB and the NAND. The exploitation portion of the "explore-exploit" trade off may refer to executing the boot operation from the location (i.e., the HMB or the NAND) that exhibits a faster boot latency. The exploration portion of the "explore-exploit" trade off may refer to the update of the current averaged estimation for the boot from the other location not utilized for the boot operation due to a slower boot latency. In one embodiment, the "explore-exploit" factor may be gradually reduced to about 0, where the more efficient location, either the HMB or the NAND, will be utilized for the boot operation.

At block 402, the static configuration is set, where the "explore-exploit" factor or EE-Factor equals 5. The EE-Factor may include values of between about 0 to about 100. At block 404, the controller initiates a counter, a set A, and a set B. The counter is set to about 0. In one embodiment, the set A refers to the NAND and the set B refers to the HMB. In the example of FIG. 4, set A has a faster average latency. In the example of FIG. 4, the set A is set to the NAND but it is understood that set A could be HMB. At block 406, a boot-initiation command is received. When the boot-initiation command is received, the boot-code chunks are loaded from the NAND boot zone and from the HMB boot zone.

At block 408, the controller determines if the remainder of the counter divided by 100 is greater than 100 minus the EE-Factor. When the remainder of the counter divided by 100 is less than 100 minus the EE-Factor, the storage device may utilize the boot-source with the lower performance or a slower average latency in order to update the current averaged estimation for the boot from the lower performance location. At block 410, the boot from set A, or the NAND, is executed in order to update the current averaged estimation for the boot because the remainder of the counter divided by 100 is less than 100 minus the EE-Factor. However, if the remainder of the counter divided by 100 is greater than 100 minus the EE-Factor at block 408, the boot executes from set B, or the HMB, at block 412.

At block 414, the average latency or the current averaged estimation for the boot from either set A or set B is calculated, tracked, and updated. At block 416, the controller determines if the boot location needs to be switched based on the average latency of each set, A and B, such that the location that indicates a better latency is marked with A. Generally, for values of EE-Factor<50, A will be utilized most of the time. If a switch is needed at block 416, then at block 418, the boot locations are switched. Thereafter, the counter is increased by 1 at block 420 and the next boot operation begins at block 406. For example, the controller may receive boot code chunks from the one or more memory devices, such as the NAND, and switch to receiving the boot code chunks from the host device, such as the HMB of the host computer system. In another example, the controller may receive boot code chunks from the host device, such as the HMB of the host computer system, and switch to receiving the boot code chunks from the one or more memory devices, such as the NAND. If the boot location does not need to switch from a first boot location to a second boot location at block 416, then the counter increase by 1 at block 420 and the next boot process 400 begins at block 406. In some embodiments, the boot process 400 may be utilized to appropriate boot code chunks unevenly to the HMB and the NAND to optimize the average latency of each location.

By utilizing boot code chunks from both the memory device and the host memory buffer, latency for the boot procedure of the data storage device is reduced.

In one embodiment, a data storage device comprises: one or more memory devices; and a controller coupled to the one or more memory devices, wherein the controller is configured to: receive boot code chunks of a boot code from a host device; and receive boot code chunks of the boot code from the one or more memory devices. The boot code includes 20 chunks of a predetermined size. The boot code chunks received from the host device are for a first half of the boot code and wherein the boot code chunks received from the one or more memory devices is for a second half of the boot code. A number of boot code chunks received from the host device is different from a number of boot code chunks received from the one or more memory devices. Each boot code chunk received has an authentication signature and wherein the controller is configured to determine whether each boot code chunk has a valid authentication signature. Upon determining an authentication signature is invalid for a specific boot code chunk, the controller is configured to receive the specific boot code chunk from the other of either the host device or the one or more memory devices that sent the invalid specific boot code chunk. The controller is configured to determine whether each boot code chunk has a valid authentication signature after loading each boot code chunk.

In another embodiment, a data storage device comprises: one or more memory devices; and a controller coupled to the one or more memory devices, wherein the controller is configured to: receive boot code chunks of a boot code from both a host device and the one or more memory devices;

confirm that all boot code chunks have been received; confirm authentication signatures for the boot code; determine whether a boot code chunk was invalid; determine whether the invalid boot code chunk was from the host device or the one or more memory devices; and receive a valid boot code chunk from whichever of the host device and the one or more memory device did not deliver the invalid boot code chunk. The controller is configured to receive multiple copies of one or more boot chunks. The controller is configured to track a number of boot code chunks received on average from both the one or more memory devices and the host device. One additional boot code chunk greater than the average is placed is each of the host device and the one or more memory devices. The controller receives the boot code chunks from the host device and the one or more memory devices in a different order. The controller receives more than half of the boot code chunks from either the host device or the one or more memory devices. The authentication signatures for the boot code are received from both the host device and the one or more memory devices.

In another embodiment, a data storage device comprises: one or more memory devices; and a controller coupled to the one or more memory devices, wherein the controller is configured to: receive boot code chunks of a boot code from either the one or more memory devices or a host device; after a predetermined number of data storage device boots, receive boot data chunks from the other of the one or more memory devices or the host device; and determine whether an average latency for receiving the boot code from the one or more memory devices is different from the average latency for receiving the boot code from the host device. The controller is further configured to receive the boot code chunks from the one or more memory devices and switch to receiving the boot code chunks from the host device. The controller is further configured to receive the boot code chunks from the host device and switch to receiving the boot code chunks from the one or more memory devices. The controller is configured to calculate the average latency for receiving the boot codes for both the one or more memory devices and the host device. The controller is configured to increase an internal counter each time a boot occurs until the predetermined number of data storage device boots has occurred. The controller includes boot logic that processes both the one or more memory device boot code chunks and the host device boot code chunks.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
one or more memory devices; and
a controller coupled to the one or more memory devices, wherein the controller is configured to:
receive boot code chunks of a boot code from a host memory buffer (HMB) of a host device, wherein the boot code is associated with a boot operation of the data storage device, wherein the boot code chunks of the boot code from the HMB are stored in the HMB during a previous run-time of the data storage device;
receive boot code chunks of the boot code from the one or more memory devices;
confirm that all boot code chunks of the boot code have been received, wherein a portion of the boot code chunks are received from the HMB and a different portion of the boot code chunks are received from the one or more memory devices;
confirm authentication signatures for all of the boot code chunks of the boot code, wherein the controller is further configured to receive a valid boot code chunk from whichever of the HMB and the one or more memory devices did not deliver the invalid boot code chunk based on confirming the authentication signatures; and
boot the data storage device using the boot code chunks received from the host device and the boot code chunks received from the one or more memory devices when the number of boot code chunks received from the host device plus the number of boot code chunks received from the one or more memory devices equals the total number of boot code chunks of the boot code.

2. The data storage device of claim 1, wherein the boot code includes 20 chunks of a predetermined size.

3. The data storage device of claim 1, wherein the boot code chunks received from the host device are for a first half of the boot code and wherein the boot code chunks received from the one or more memory devices is for a second half of the boot code.

4. The data storage device of claim 1, wherein the number of boot code chunks received from the host device is different from the number of boot code chunks received from the one or more memory devices.

5. The data storage device of claim 1, wherein each boot code chunk received has an authentication signature and wherein the controller is configured to determine whether each boot code chunk has a valid authentication signature.

6. The data storage device of claim 5, wherein, upon determining an authentication signature is invalid for a specific boot code chunk, the controller is configured to receive the specific boot code chunk from the other of either the host device or the one or more memory devices that sent the invalid specific boot code chunk.

7. The data storage device of claim 5, wherein the controller is configured to determine whether each boot code chunk has a valid authentication signature after loading each boot code chunk.

8. A data storage device, comprising:
one or more memory devices; and
a controller coupled to the one or more memory devices, wherein the controller is configured to:
receive boot code chunks of a boot code from both a host memory buffer (HMB) of a host device and the one or more memory devices, wherein:
the boot code is associated with a boot operation of the data storage device;
the boot code chunks of the boot code from the HMB are stored in the HMB during a previous run-time of the data storage device;
confirm that all boot code chunks have been received;
confirm authentication signatures for the boot code;
determine whether a boot code chunk was invalid;
determine whether the invalid boot code chunk was from the host device or the one or more memory devices;
receive a valid boot code chunk from whichever of the host device and the one or more memory device did not deliver the invalid boot code chunk; and
boot the data storage device using the boot code chunks received from the host device, the boot code chunks received from the one or more memory devices, and the valid boot code chunk responsive to the receiving the valid boot code chunk.

9. The data storage device of claim 8, wherein the controller is configured to receive multiple copies of one or more boot chunks.

10. The data storage device of claim 8, wherein the controller is configured to track a number of boot code chunks received on average from both the one or more memory devices and the host device.

11. A data storage device, comprising:
one or more memory devices; and
a controller coupled to the one or more memory devices, wherein the controller is configured to:
  receive boot code chunks of a boot code from both a host device and the one or more memory devices;
  track a number of boot code chunks received on average from both the one or more memory devices and the host device, wherein one additional boot code chunk greater than the average is placed in each of the host device and the one or more memory devices;
  confirm that all boot code chunks have been received;
  confirm authentication signatures for the boot code;
  determine whether a boot code chunk was invalid;
  determine whether the invalid boot code chunk was from the host device or the one or more memory devices; and
  receive a valid boot code chunk from whichever of the host device and the one or more memory device did not deliver the invalid boot code chunk.

12. The data storage device of claim 8, wherein the controller receives the boot code chunks from the host device and the one or more memory devices in a different order.

13. The data storage device of claim 8, wherein the controller receives more than half of the boot code chunks from either the host device or the one or more memory devices.

14. The data storage device of claim 8, wherein the authentication signatures for the boot code are received from both the host device and the one or more memory devices.

15. A data storage device, comprising:
one or more memory devices; and
a controller coupled to the one or more memory devices, wherein the controller is configured to:
  receive boot code chunks of a boot code from either the one or more memory devices or a host memory buffer (HMB) of a host device;
  after a predetermined number of data storage device boots, receive boot data chunks from the other of the one or more memory devices or the HMB of the host device;
  determine whether an average latency for receiving the boot code from the one or more memory devices is different from the average latency for receiving the boot code from the host device; and
  adjust a first number of boot code chunks of the boot code stored in the one or more memory devices and a second number of boot code chunks of the HMB of the host device based on the determining, wherein:
    a total number of boot code chunks equals the first number of boot code chunks and the second number of boot code chunks; and
    the boot code chunks of the boot code stored in the one or more memory devices is different than the boot code chunks of the boot code stored in the HMB of the host memory buffer.

16. A data storage device, comprising:
one or more memory devices; and
a controller coupled to the one or more memory devices, wherein the controller is configured to:
  receive boot code chunks of a boot code from either the one or more memory devices or a host device;
  after a predetermined number of data storage device boots, receive boot data chunks from the other of the one or more memory devices or the host device;
  determine whether an average latency for receiving the boot code from the one or more memory devices is different from the average latency for receiving the boot code from the host device; and
  receive the boot code chunks from the one or more memory devices and switch to receiving the boot code chunks from the host device.

17. A data storage device, comprising:
one or more memory devices; and
a controller coupled to the one or more memory devices, wherein the controller is configured to:
  receive boot code chunks of a boot code from either the one or more memory devices or a host device;
  after a predetermined number of data storage device boots, receive boot data chunks from the other of the one or more memory devices or the host device;
  determine whether an average latency for receiving the boot code from the one or more memory devices is different from the average latency for receiving the boot code from the host device; and
  receive the boot code chunks from the host device and switch to receiving the boot code chunks from the one or more memory devices.

18. A data storage device, comprising:
one or more memory devices; and
a controller coupled to the one or more memory devices, wherein the controller is configured to:
  receive boot code chunks of a boot code from either the one or more memory devices or a host device;
  after a predetermined number of data storage device boots, receive boot data chunks from the other of the one or more memory devices or the host device;
  determine whether an average latency for receiving the boot code from the one or more memory devices is different from the average latency for receiving the boot code from the host device; and
  calculate the average latency for receiving the boot codes for both the one or more memory devices and the host device.

19. A data storage device, comprising:
one or more memory devices; and
a controller coupled to the one or more memory devices, wherein the controller is configured to:
  receive boot code chunks of a boot code from either the one or more memory devices or a host device;
  after a predetermined number of data storage device boots, receive boot data chunks from the other of the one or more memory devices or the host device;
  determine whether an average latency for receiving the boot code from the one or more memory devices is different from the average latency for receiving the boot code from the host device; and
  increase an internal counter each time a boot occurs until the predetermined number of data storage device boots has occurred.

20. A data storage device, comprising:
one or more memory devices; and a controller coupled to the one or more memory devices, wherein the controller is configured to:
receive boot code chunks of a boot code from either the one or more memory devices or a host device;
after a predetermined number of data storage device boots, receive boot data chunks from the other of the one or more memory devices or the host device; and
determine whether an average latency for receiving the boot code from the one or more memory devices is different from the average latency for receiving the boot code from the host device, wherein the controller includes boot logic that processes both the one or more memory device boot code chunks and the host device boot code chunks.

* * * * *